Patented Aug. 2, 1938

2,125,527

UNITED STATES PATENT OFFICE 2,125,527

COATING OF ABSORBENT MATERIALS

George Crawford Tyce, Norton-on-Tees, and Victor Lefebure, London, England, assignors to Imperial Chemical Industries Limited, a corporation of Great Britain No Drawing. Application April 2, 1937, Serial No. 134,676. In Great Britain April 15, 1936

7 Claims. (Cl. 91—68)

This invention relates to the coating of absorbent materials by means of aqueous dispersions of solid water-insoluble resins.

It has already been proposed to coat absorbent materials such as textile fabrics, paper, leather or the like by applying to the surface of the material an aqueous colloidal dispersion of solid water-insoluble resins such as polymerization products of mono-vinyl compounds such as acrylic acid esters, vinyl chloride or acetate, or polymerized styrene.

When the above mentioned colloidal dispersions are applied by the usual method, namely, by applying them to the surface of the material to be coated and allowing the material to dry slowly in the air or under the influence of moderate heat, the solid resin is precipitated in the form of discrete granules which require further prolonged treatment under heat and pressure to produce a smooth or glossy surface. For this reason it has not hitherto been possible to combine the various operations of applying the dispersion to the material, drying and pressing, into a continuous process suitable for the treatment of material in long lengths.

This invention has as an object to devise a new method of coating absorbent materials with such resins. A further object is to devise a method of coating absorbent materials with such resins so that the resins form a continuous film on the surface of the absorbent material. A further object is to devise a method of coating absorbent materials with such resins so as to produce a coated material having a glossy surface. A further object is to devise such a method that can be operated as a continuous process. A further object is to provide absorbent materials having a coating of such resins in the form of a continuous film. A further object is to provide absorbent materials with a coating of such resins having a glossy surface. Further objects will appear hereafter.

These objects are accomplished by the following invention.

We have now found that if the removal of water from the dispersion applied to the surface of the material is carried out at a rapid rate by heating to a comparatively high temperature for a short time the resin is deposited in the form of a continuous clear film. By passing the coated material through heated calender rolls a glossy surface is directly obtained.

According to our invention, therefore, we coat absorbent material such as paper, cardboard, textiles, leather, or the like, preferably in long lengths, by means of aqueous dispersions of resins and subject the material to rapid drying at a temperature above about 110° C. We then pass the material through heated calender rolls.

The following example illustrates the application of the invention to a continuous process for the coating of paper with polymerized methyl methacrylate, but the invention is not limited to the process described.

Example

A resin dispersion is prepared by adding 120 c. c. of monomeric methyl methacrylate to 300 c. c. of a 1.6% NaOH solution containing a suitable polymerization accelerator, e. g. a peroxide. Dibutyl phthalate or other plasticizer may be added if required, and if desired, about 60 c. c. of cyclohexanone. The mixture is stirred and heated to 80° C. Polymerization occurs and a colloidal dispersion of the solid polymerization product is formed. To this dispersion is added 10% by volume of an emulsion of white wax such as that known under the registered trade-mark "Waxol".

The dispersion is fed continuously to a coating machine through which paper passes at the rate of about 3 yards per minute. The wet paper passes from the coating machine through a heating box at a temperature of about 110-115° C. in such a manner that the paper is subjected to this temperature for about 5 seconds, whereby a continuous film of the resin is deposited on the surface of the paper. Preferably the heating is arranged in such a manner that the coated surface of the paper is directly exposed to radiant heat. The paper is then completely dried in a cabinet drier at about 75° C. and passed between three nips of a heated four bowl calender at a temperature of 125° C. and a pressure of approximately 700 lbs. per sq. in. The finished paper, which has a highly glazed surface, is collected on a 6 inch diameter beam.

Suitable resins for the purpose of the invention are, for example, water insoluble polymerization products of mono-vinyl compounds, such as vinyl chloride or acetate; polymerized esters of acrylic acid or its homologues, e. g. methyl methacrylate, ethyl methacrylate, propyl methacrylate, iso-butyl methacrylate, butyl methacrylate, octyl methacrylate; polymerized styrene and polyhydric alcohol-polybasic acid resins. Mixtures of such resins would also be suitable as also would be the products of interpolymerizing two or more of the above compounds.

The temperature of drying depends upon the kind of resin used. It should be sufficiently high to remove substantially the whole of the water from the dispersion in about 5 to 10 seconds but not so high as to cause decomposition of the resin. Temperatures up to just below the melting point of the resin may be used but the higher the temperature employed the shorter should be the time of heating, in order to avoid decomposition. It is not necessary that the material should be completely dried at the high temperature. Provided that the water is substantially removed from the resin dispersion on the surface of the material, a further period of heating at a lower temperature may be given to remove absorbed water. The dried material may then be passed through calender rolls heated to about 120–130° C.

The addition of a suitable wax to the resin dispersion has been found advantageous. By this means a film of wax is produced over the coated surface of the material which provides a cushion between the hot calender roll and the material, and facilitates the stripping of the material from the rolls. The wax may subsequently be removed from the finished product by polishing or other suitable means.

As many apparently widely different embodiments of our invention may be made without deparing from the spirit and scope thereof, it is to be understood that we do not limit ourselves to the specific embodiments thereof except as defined in the appended claims.

We claim:

1. A process for treating absorbent materials with resin so as to produce a coated material with a glossy surface which comprises applying to the materials a dispersion of solid resins insoluble in the dispersing medium and subjecting the material to a temperature between the boiling point of the dispersing medium and the melting point of the resin until the resin has formed a continuous film on the surface of the material, drying the material at a lower temperature and then passing the material through hot rollers.

2. A process as claimed in claim 1 wherein the dispersing medium is water.

3. A process as claimed in claim 1 wherein the dispersing medium is water and the material is subjected to a temperature between 110° C. and the boiling point of the resin.

4. A process as claimed in claim 1 where the absorbent material is paper.

5. A process as claimed in claim 1 where the temperature chosen is such that the resin will be formed in a continuous film in 5 to 10 seconds.

6. A process according to claim 1 where a wax is incorporated with the dispersion.

7. A process for imparting a glossy surface to a sheet of paper which comprises applying to the paper an aqueous dispersion of polymerized methyl methacrylate, subjecting the paper so treated for 5 to 10 seconds to a temperature of from 110° C. to 115° C., drying the paper at a temperature below 100° C. and passing the paper through a heated calender.

GEORGE CRAWFORD TYCE.
VICTOR LEFEBURE.